United States Patent
Gray

Patent Number: 5,094,901
Date of Patent: Mar. 10, 1992

[54] OXIDATION RESISTANT CERAMIC MATRIX COMPOSITES

[75] Inventor: Paul E. Gray, North East, Md.

[73] Assignee: E. I. Du Pont de Nemours and Company, Wilmington, Del.

[21] Appl. No.: 554,475

[22] Filed: Jul. 19, 1990

[51] Int. Cl.$^5$ ............................................. B32B 9/00
[52] U.S. Cl. ..................................... 428/141; 428/213; 428/336; 428/408; 428/697; 428/698; 428/699
[58] Field of Search ............... 428/408, 698, 697, 699, 428/366, 110, 285, 213, 336, 141, 704

[56] References Cited

U.S. PATENT DOCUMENTS

| | | | |
|---|---|---|---|
| 3,895,084 | 7/1975 | Bauer | 264/29 |
| 3,991,248 | 11/1976 | Bauer | 428/245 |
| 4,275,095 | 6/1981 | Warren | 427/228 |
| 4,397,901 | 8/1983 | Warren | 428/101 |
| 4,429,003 | 1/1984 | Fredriksson et al. | 428/408 |
| 4,442,165 | 4/1984 | Gebhardt et al. | 428/408 |
| 4,515,847 | 5/1985 | Taverna et al. | 428/408 |
| 4,515,860 | 5/1985 | Holzl | 428/408 |
| 4,582,751 | 4/1986 | Vasilos et al. | 428/307.3 |
| 4,599,256 | 7/1986 | Vasilos | 428/114 |
| 4,605,588 | 8/1986 | Simpson et al. | 428/366 |
| 4,613,522 | 9/1986 | Vasilos | 427/202 |
| 4,642,271 | 2/1987 | Rice | 428/698 |
| 4,668,579 | 5/1989 | Strangman et al. | 428/367 |
| 4,735,850 | 4/1988 | Eitman | 428/283 |
| 4,752,503 | 6/1988 | Thebault | 427/248.1 |
| 4,761,323 | 8/1988 | Mühlratzer et al. | 428/408 |
| 4,766,013 | 8/1988 | Warren | 427/228 |
| 4,795,677 | 1/1989 | Gray | 428/246 |
| 4,863,773 | 9/1989 | Rousseau et al. | 428/68 |
| 4,863,798 | 9/1989 | Arenz et al. | 428/368 |
| 4,869,943 | 9/1989 | Corbin et al. | 428/114 |
| 4,873,353 | 10/1989 | Niebylski | 556/402 |
| 4,885,199 | 12/1989 | Corbin et al. | 428/113 |
| 4,889,686 | 12/1989 | Singh et al. | 428/213 |
| 4,892,790 | 1/1990 | Gray | 425/548 |
| 4,894,286 | 1/1990 | Gray | 428/408 |
| 4,902,563 | 2/1990 | McCullough, Jr. et al. | 428/285 |
| 4,944,904 | 7/1990 | Singh et al. | 428/110 |
| 4,948,662 | 8/1990 | Simpson et al. | 428/366 |

*Primary Examiner*—Ellis P. Robinson
*Assistant Examiner*—Archene Turner

[57] ABSTRACT

Ceramic matrix composites having a boron containing oxygen-scavenging sealant-forming region coextensive with the internal fibers and interface debonding layer and a ceramic matrix material provide superior resistance to oxidation.

30 Claims, 2 Drawing Sheets

OXIDATION RESISTANT CERAMIC MATRIX COMPOSITES

BACKGROUND OF THE INVENTION

This invention relates to improved ceramic matrix composites. Such composites have been used in applications requiring stability to high temperatures and thermal shock. One example of such an application is the use of ceramic matrix exhaust components in high performance jet engines.

Even though ceramic matrix composite articles are capable of withstanding higher use temperatures than metals there continues to be a need for composites which will withstand repeated exposure to higher temperatures and more severe thermal shocks One of the major causes of failure of composite structures in severe environments is oxidation. Another problem is degradation of properties due to repeated exposure to high humidity between thermal excursions.

There have been a number of attempts to solve these problems. One approach has been to select materials for the composite that inherently resist oxidation. Substitution of silicon carbide fibers for carbon fibers is one example of this approach. However, the more oxidation-resistant materials may not possess the same level of strength as the more readily oxidizeable materials. Further, even if oxidizeable carbon fibers are replaced by more oxidation-resistant fibers, most composites employ an interface debonding layer which generally is pyrolytic carbon or some other material also subject to oxidation. Further, differences in coefficients of thermal expansion between the fibers and the matrix materials, or between the matrix materials and the outer coating can result in cracking, oxidation and failure. The problems caused by differences in coefficients of thermal expansion between substrates and coatings and between fibers and matrices have caused many to focus efforts on composites where the fiber and the matrix are of the same material.

Another approach to overcoming the oxidation of composites has been the use of glass-formers as oxidation inhibitors. These materials have been used as layers over the matrix, and as additives to the matrix itself. Materials such as boron, when oxidized, form a sealing glass which fills passageways through which oxygen enters the composite and prevents further oxidation. A number of patents teach the use of glass formers as oxidation inhibitors in carbon-carbon composites. See U.S. Pat. No. 4,795,677; U.S. Pat No. 4,894,286; U.S. Pat. No. 4,892,790; and U.S. Pat. No. 4,599,256.

In spite of the advances that have been made, there remains a demand for composite materials that are capable of withstanding high temperatures and large thermal shocks as well as exposure to high humidity. This invention provides composite materials which are both easily made and which exhibit greater resistance to oxidation than composites known heretofore. This resistance to oxidation can be demonstrated in conditions of repeated high temperature excursions, high humidity conditions and in high temperature low pressure conditions.

SUMMARY OF THE INVENTION

The composites of this invention employ fibers for strengthening the structure. The fibers can be either carbon fibers or ceramic fibers. Of these, carbon fibers are preferred for their superior properties. Among the ceramic fibers, SiC and $Si_3N_4$ are preferred for the combination of thermomechanical properties and compatibility with the like preferred matrix materials.

The fibers are surrounded by an interface debonding layer. This layer is in intimate contact with the fibers, meaning that the layer either surrounds each fiber or surrounds bundles of fibers. This layer separates the fibers from the matrix material. The layer is from 0.05 to 2 micrometers thick with a thickness of 0.2 to 1.2 micrometers being preferred. Preferred materials for the interface debonding layer are pyrolytic carbon and boron nitride with carbon being the more preferred material. This invention relates to composite structures in which either the fibers or the interface debonding layer or both are carbon.

Coextensive with the fibers and the interface debonding layer is an oxygen-scavenging sealant-forming region. This region contains a $B_2O_3$ precursor, that is, boron or a boron compound that will oxidize in the presence of oxygen to form $B_2O_3$. Among these, metallic boron, $B_4C$, $SiB_6$ and BN are preferred. The weight ratio of oxygen-scavenging sealant-forming region to the total weight of the fibers and interface debonding layer which it surrounds is from 0.05 to 0.7, or preferably 0.35 to 0.45. In preferred embodiments, the oxygen-scavenging sealant-forming region also contains a source of silicon. In more preferred embodiments the source of silicon is an $SiO_2$ precursor, that is, silicon or a silicon compound capable of oxidizing to $SiO_2$ in the presence of oxygen. In these embodiments the molar ratio of boron to silicon in the oxygen-scavenging sealant-forming region is from 1 to 1 to 10 to 1.

The structures of this invention also include a matrix of ceramic material. Preferred are matrices which contain silicon. Oxidation resistant matrix materials such as SiC and $Si_3N_4$ are more preferred. Other ceramic materials may be included, but preferred matrices are substantially free of boron or boron compounds. The entire ceramic matrix composite structure may be surrounded by an external coating which may be of the same material as the matrix. Such coatings may be separated from the matrix material by a glass forming layer.

In preferred structures the fiber is carbon or SiC, the interface debonding layer is carbon, the oxygen-scavenging sealant-forming region is boron, $B_4C$, $SiB_6$ or BN and the matrix is SiC. Alternatively, preferred structures may employ carbon or $Si_3N_4$ as the fiber, carbon as the interface debonding layer, boron, $B_4C$, $SiB_4$ of BN as the oxygen-scavenging sealant-forming region and $Si_3N_4$ as the matrix. Most preferred are structures wherein the fiber is carbon, the interface debonding layer is carbon, the oxygen-scavenging sealant-forming region is boron, $B_4C$, $SiB_6$ or BN and the matrix is SiC.

DESCRIPTION OF THE PREFERRED EMBODIMENTS

Figure 1:
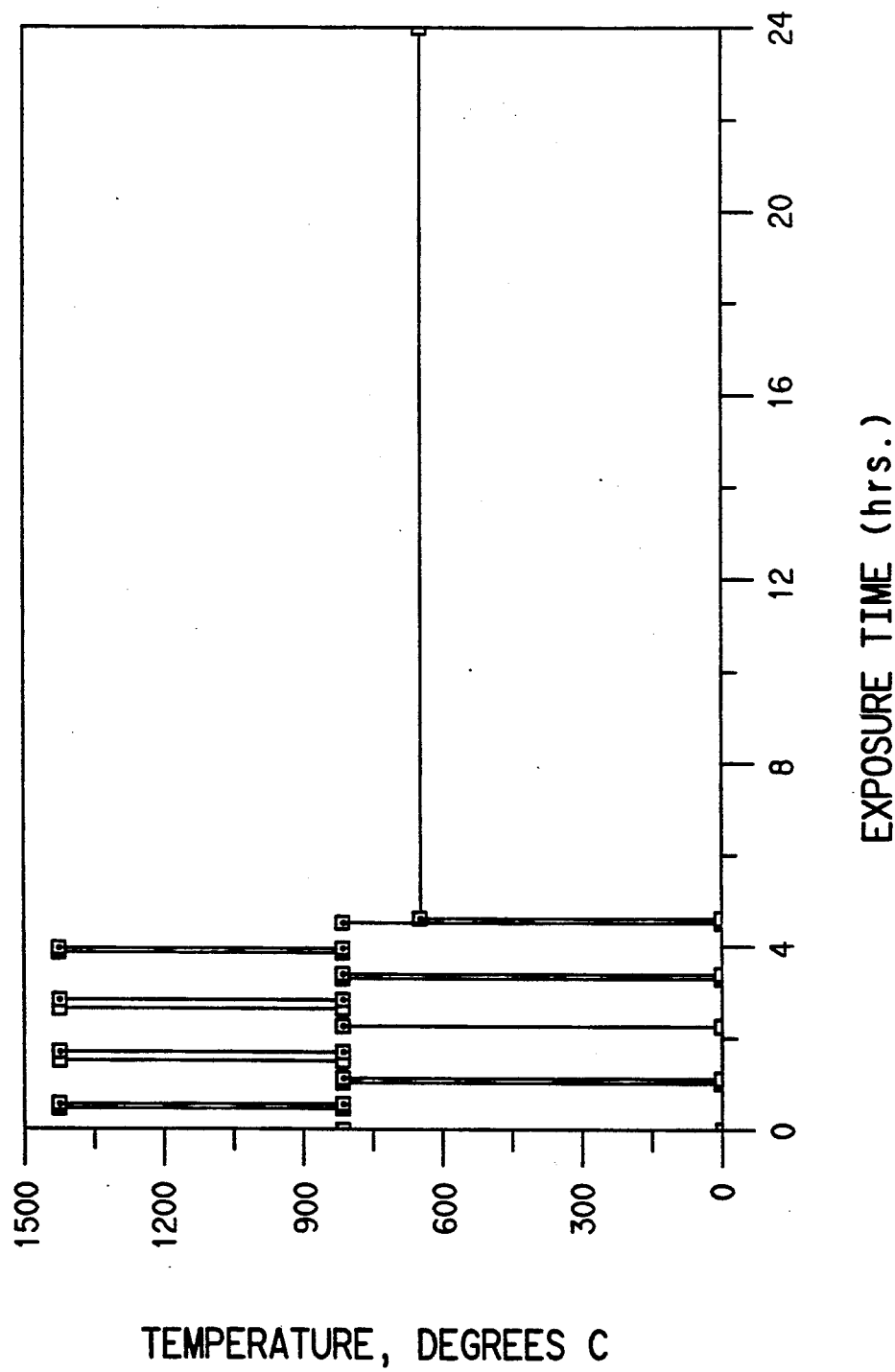
FIG. 1 is a graph of time versus temperature in an oxidation screening test described in the Examples.

The composite structures of this invention are made by applying successive coatings to a fiber preform. The fibers may be carbon fibers such as graphite, or they may be ceramic fibers. These are woven into a cloth, or individual fibers may be arranged in two or three dimensional arrays to provide the desired degree of reinforcement of the finished structure.

The terms used to identify the ceramic fibers which are preferred, SiC and $Si_3N_4$, are intended to include both the pure fibers and fibers which are primarily SiC or $Si_3N_4$, but which can contain some other elements. For example one commercial 637 SiC" fiber, Nicalon* (a trademark of Nippon Carbon) contains in addition to SiC, oxygen as well as excess carbon.

The preform is coated to form an interface debonding layer which serves to absorb energy of propagating cracks and helps prevent breakage of the fibers when cracks are formed in the matrix. Such interface debonding layers and the manner of applying them to fiber preforms are taught in U.S. Pat. No. 4,752,503, the disclosure of which is incorporated by reference. Appropriate interface debonding material, carbon or boron nitride is deposited on the fibers by chemical vapor infiltration (CVI) to form a layer which surrounds and separates either the individual fibers or bundles of fibers from the matrix material. The layer is preferably continuous.

The oxygen-scavenging sealant-forming region is also applied. The term "region" as used here indicates that the oxygen-scavenging sealant-forming is discontinuous particulate filler material distributed among the fibers and is substantially coextensive with the fibers and interface debonding layer, but is not interspersed throughout the matrix. Since the boron of the oxygen-scavenging sealant-forming region has a high affinity for any oxygen present at high temperatures, and since any boron suboxides produced also have a high affinity for oxygen and a high diffusivity, even discontinuous regions can provide significant protection to the underlying fibers and interface debonding layer, at least one of which is carbon and readily oxidizeable.

The boron or boron compounds of the oxygen-scavenging sealant-forming region readily react with oxygen forming a glass which expands into any microcracks which are present and retards the further penetration of oxygen. Regions which contain both $B_2O_3$ precursors and $SiO_2$ or $SiO_2$ precursors will oxidize in the presence of oxygen to provide a borosilicate glass of higher viscosity and even greater resistance to oxygen penetration than is provided by $B_2O_3$ glass. However, even if the region does not contain $SiO_2$ or $SiO_2$ precursors, in the preferred ceramic matrices of this invention which contain silicon in some form, silicon is dissolved from the surrounding matrix and oxidized to form borosilicate glass, thus providing the improved protection.

Suitable oxygen-scavenging material dispersed in a resin may be sprayed onto the preform, or the preform may be dipped in such a dispersion. Alternatively, fiber or fiber tow from which the preform is fabricated may be so treated. The coated preform is then heated to remove the resin. The resin should be one that will leave no char when the coated preform is heated prior to application of the matrix material. An acrylic resin is one example of such a resin. The particles in such a dispersion should be fine enough to easily remain in suspension during application, yet not so fine that it interferes with subsequent CVI infiltatrion of the preform. It is convenient to apply it to the fiber and/or the preform first, prior to application of the interface debonding layer. The oxygen-scavenging sealant-forming material so applied will not coat the fibers to such an extent that it will interfere with subsequent application of the interface debonding layer by CVI. Further, though CVI application of the interface debonding layer to the fibers will also result in coating of the oxugen scavenging sealant-forming particles with the interface debonding layer, this will not substantially interfere with or detract from the oxidation protection provided by the oxygen-scavenging sealant-forming region. It is application of the oxygen-scavenging sealant-forming material as a particulate suspension which provides advantages of economical manufacture as compared to methods requiring application of multiple layers by CVI techniques.

Matrix material is applied over the preform/interface debonding layer/oxygen-scavenging sealant-forming region by CVI by techniques well known in the art. Similarly, external coating of ceramic material, or a glass forming layer covered by a ceramic coating can be applied by techniques well known in the art. Since the components of the structure that are most prone to oxidation, the fiber and/or the interface debonding layer are protected by the oxygen-scavenging sealant-forming region, it is not necessary to interperse glass forming boron compounds throughout the matrix. This permits formation of matrices with undisrupted crystalline structures.

The matrix may be any ceramic material. The preferred matrix materials useful in this invention are described as "silicon containing ceramics". This is intended to include both pure compounds of silicon such as SiC and mixtures of silicon based compounds with other ceramic materials which do not contain silicon compounds.

EXAMPLE I

This Example employs particulate oxygen-scavenging sealant-forming fillers in composites also having an outer ceramic coating forming a barrier against penetration of oxygen.

Ceramic matrix composite test coupons were made using two different oxygen-scavenging sealant-forming materials. They were incorporated in an acrylic resin as particulate filler material. The first filler consisted of 40% by weight $B_4C$ and 60% $SiB_6$. The second filler was $SiB_6$. A resin mixture was prepared by dissolving 1 part acrylic resin in acetone. To this mixture was added 1 part particulate filler. The resultant resin mixture was applied to a carbon cloth consisting of Amoco T-300 PAN-based carbon fibers. The amount of resin applied was such that the weight of resin and filler amounted to about 80 percent of the fabric weight after the solvent was driven off.

The coated plies were then molded into the shape of a flat panel using a conventional low temperature laminating press. Since the resin is thermoplastic, temperatures on the order of 250° F. were used. The molded laminate was then placed in graphite tooling to restrain the plies after the acrylic resin was burned out. The tooling had holes in the faces to allow infiltration by chemical vapor methods. The panel and tooling were then placed in a CVI reactor and the part heated slowly in a vacuum to the deposition temperature of the pyrolytic carbon interface. During heating, the acrylic resin burned away leaving a porous preform restrained within the tooling. Low pressure methane was admitted to the reactor at less than 70 torr at about 1000° C. to build up a pyrolytic interface coating layer of about 0.5 micrometer on the fibers. The furnace was then cooled, the part inspected in the tooling.

The now-coated preform was then placed in a CVI reactor to deposit SiC around the carbon coating on the carbon fibers. The panel was allowed to remain in the reactor long enough to coat the internal voids until an open porosity of about 10 percent remained. The SiC-infiltrated panel was cut into coupons and a 0.010 inch layer of SiC was then applied by CVD over the exterior of the test coupons to seal off external porosity. Some of the SiC-coated coupons were tested for flexural strength in 4-point bending, 13:1 span-to-depth, load applied in thirds. Other coupons were subjected to thermal cycling according to the profile shown in FIG. 1 for periods of 1000 and 2000 hours and then broken to measure retained strength. The thermal cycle shown in FIG. 1 involves repetitive heating to 1400° C. and cooling to room temperature. Samples were held at the maximum temperature for 8 minutes, and held at an intermediate temperature of 815° C. for 30 minutes, both as they were heated and as they were cooled. Following these heating/cooling cycles the samples were held overnight at a temperature of 650° C. The results of these flexural strength tests are set out in the table below, all data being an average of results for three specimens.

| Flexural Strength [KPSI/(MPa)] After Exposure To Oxidation Cycle | | | |
| --- | --- | --- | --- |
| Filler in | Hours of Exposure | | |
| Sample | 0 | 1000 | 2000 |
| $B_4C$/SiC | 58.0(400) | 56.0(386) | — |
| $B_4C$/SiC | 58.0(400) | — | 56.8(392) |
| $SiB_6$ | 42.3(292) | 45.3(313) | — |
| $SiB_6$ | 58.0(400) | — | 56.2(388) |

Figure 2:
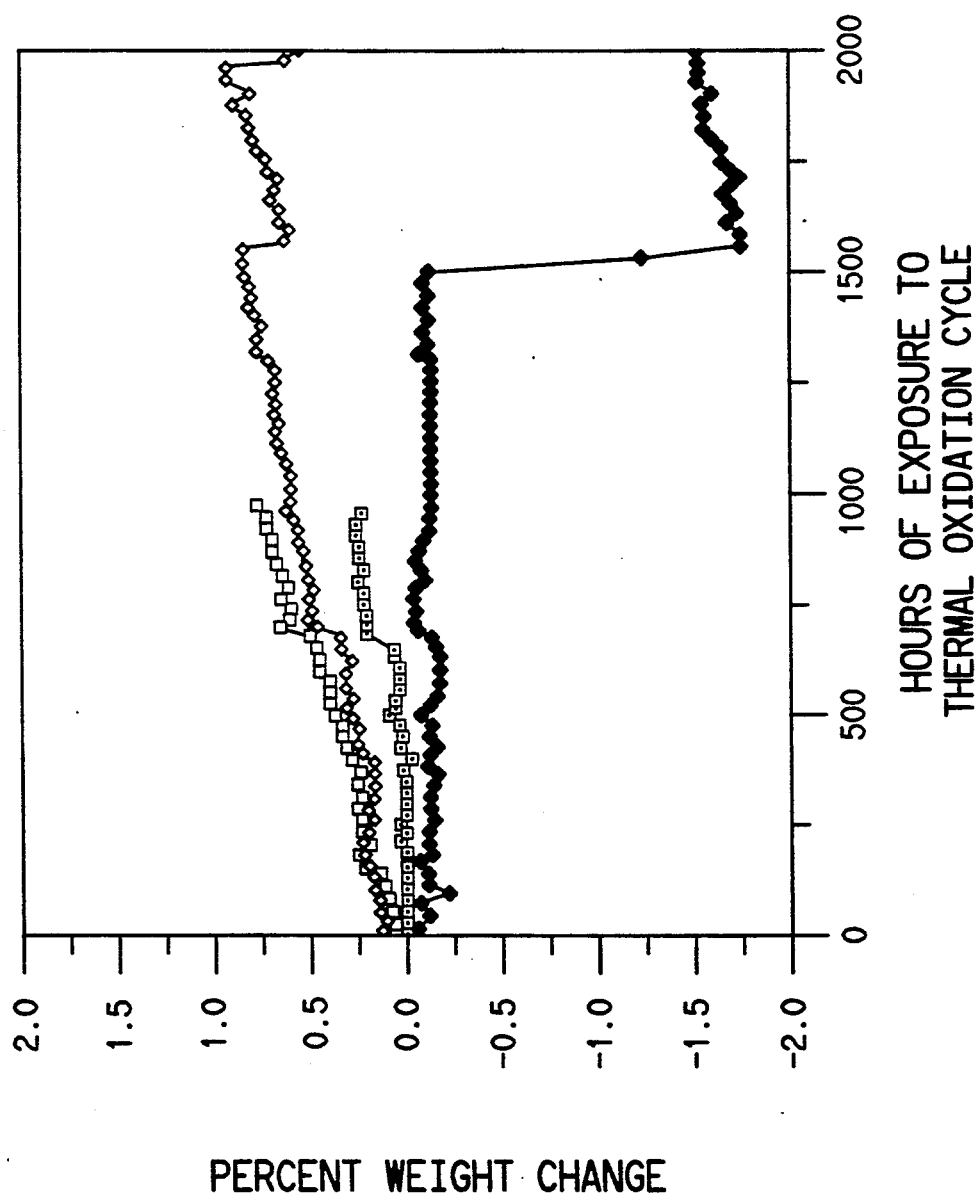
FIG. 2 is a plot of the weight change of samples described in Example 1 subjected to the oxidation test with the temperature cycle illustrated in FIG. 1.

The weight change data for individual coupons in the oxidation tests are shown in FIG. 2. The top and bottom curves show data for coupons in which the filler was $B_4C$/SiC. The remaining two curves show data for coupons in which the filler was $SiB_6$. The bottom curve shows weight change data for a coupon which chipped after about 1500 hours exposure to the thermal cycle. Interestingly, the protection provided by the internal oxygen-scavenging sealant-forming filler prevented rapid oxidation of the remainder of the coupon which would have occured if the only protection against oxidation were the external layer.

I claim:

1. An oxidation resistant ceramic matrix composite structure comprising reinforcing fibers selected from the group consisting of carbon fibers and ceramic fibers; an interface debonding layer in intimate contact with said fibers said layer having a thickness of from 0.05 to 2 micrometers with the proviso that if the fibers are ceramic then the layer must be carbon; and oxygen-scavenging sealant-forming region consisting essentially of discontinuous particulate material containing a $B_2O_3$ precursor, said region substantially coextensive with said fibers and said interface debonding layer wherein the weight ratio of said oxygen-scavenging sealant-forming region to said fibers plus said interface debonding layer is from 0.05 to 0.7; and a ceramic matrix material.

2. A composite structure of claim 1 wherein the fiber is selected from the group consisting of carbon, silicon nitride and silicon carbide.

3. A composite structure of claim 1 wherein the interface debonding layer is selected from the group consisting of carbon and boron nitride and has a thickness of from 0.05 to 2 micrometers.

4. A composite structure of claim 1 wherein the interface debonding layer is selected from the group consisting of carbon and boron nitride and has a thickness of from 0.2 to 1.2 micrometers.

5. A composite structure of claim 1 wherein the ceramic matrix material is substantially free of boron compounds.

6. A composite structure of claim 1 wherein the ceramic matrix material is a silicon containing ceramic.

7. A composite structure of claim 5 wherein the ceramic matrix material is a silicon containing ceramic.

8. A composite structure of claim 1 having an external refractory coating.

9. A composite structure of claim 1 having an external refractory coating of the same material as the ceramic matrix material.

10. A composite structure of claim 1 having an external coating of the same material as the ceramic matrix material separated from the ceramic matrix material by a glass forming layer.

11. A composite structure of claim 1 wherein the weight ratio of oxygen-scavenging sealant-forming region to the fibers plus the interface layer is from 0.35 to 0.45.

12. A composite structure of claim 1 wherein the oxygen-scavenging sealant-forming region contains a source of silicon such that the mole ratio of boron to silicon is from 1:1 to 10:1.

13. A composite structure of claim 12 wherein the source of silicon is a $SiO_2$ precursor.

14. A composite structure of claim 4 wherein the ceramic matrix material is substantially free of boron compounds and is a silicon containing ceramic.

15. A composite structure of claim 4 having an external refractory coating.

16. A composite structure of claim 4 having an external refractory coating of the same material as the ceramic matrix material.

17. A composite structure of claim 14 having an external coating of the same material as the ceramic matrix material separated from the ceramic matrix material by a glass forming layer.

18. A composite structure of claim 4 wherein the weight ratio of oxygen-scavenging sealant-forming region to the fibers plus the interface layer is from 0.35 to 0.45.

19. A composite structure of claim 17 wherein the weight ratio of oxygen-scavenging sealant-forming region to fibers plus the interface debonding layer is from 0.35 to 0.45.

20. A composite structure of claim 4 wherein the oxygen-scavenging sealant-forming region contains a $SiO_2$ precursor such that the mole ratio of boron to silicon is from 1:1 to 10:1.

21. A composite structure of claim 20 wherein the ceramic matrix material is substantially free of boron compounds.

22. A composite structure of claim 21 the composite structure has an external coating of the same material as the ceramic matrix material separated from the ceramic matrix material by a glass forming layer.

23. A composite structure of claim 22 wherein the weight ratio of oxygen-scavenging sealant-forming region to the fibers plus the interface debonding layer is from 0.35 to 0.45.

24. A composite structure of any one of claims 1 to 25 wherein the fiber is selected from the group consisting of carbon, SiC, and $Si_3N_4$.

25. A composite structure of any one of claims 1 to 25 wherein the ceramic matrix material is selected from the group consisting of SiC and $Si_3N_4$.

26. A composite structure of any one of claims 1 to 25 wherein the interface debonding layer is selected from the group consisting of carbon and boron nitride.

27. A composite structure of any one of claims 1 to 25 wherein the oxygen-scavenging sealant-forming region comprises a member selected from the group consisting of boron, $B_4C$, $SiB_6$ and boron nitride.

28. A composite structure of any one of claims 1 to 25 wherein the fiber is selected from the group consisting of carbon and SiC, the ceramic matrix material is SiC, the interface debonding layer is carbon and the oxygen-scavenging sealant-forming region comprises a member selected from the group consisting of boron, $B_4C$, $SiB_6$ and boron nitride.

29. A composite structure of any one of claims 1 to 25 wherein the fiber is selected from the group of carbon and $Si_3N_4$, the ceramic matrix material is $Si_3N_4$, the interface debonding layer is carbon and the oxygen-scavenging sealant-forming region comprises a member selected from the group consisting of boron, $B_4C$, $SiB_6$ and boron nitride.

30. A composite structure of any one of claims 1 to 25 wherein the fiber is carbon, the ceramic matrix material is SiC, the interface debonding layer is carbon and the oxygen-scavenging sealant-forming region comprises a member selected from the group consisting of boron, $B_4C$, $SiB_6$ and boron nitride.

* * * * *